United States Patent [19]
Kimura et al.

[11] Patent Number: 5,161,031
[45] Date of Patent: Nov. 3, 1992

[54] APPARATUS FOR PROCESSING DATA FOR A VIDEO TAPE RECORDER

[75] Inventors: Junko Kimura; Shigeo Tanaka, both of Kanagawa, Japan

[73] Assignee: Kabushiki Kaisha Toshiba, Kanagawa, Japan

[21] Appl. No.: 496,929

[22] Filed: Mar. 21, 1990

[30] Foreign Application Priority Data

Mar. 22, 1989 [JP] Japan .................... 1-070127

[51] Int. Cl.$^5$ .............................. H04N 9/79
[52] U.S. Cl. .................................. 358/310
[58] Field of Search .............. 358/310, 335, 909; 360/8, 9.1, 10.1, 35.1, 33.1, 39

[56] References Cited

U.S. PATENT DOCUMENTS 4,831,440  5/1989  Borgers et al. ............. 364/725 X

FOREIGN PATENT DOCUMENTS

0122094A2  10/1984  European Pat. Off. .
2070887A    9/1981  United Kingdom .
2088115A    6/1982  United Kingdom .
2094591A    9/1982  United Kingdom .

OTHER PUBLICATIONS

Digital Signal Processing of Images, Chap. 5, Sec. 4, "Frequency Interleaved Sampling," T. Fukinuki, 1987.

Primary Examiner—Robert L. Richardson
Attorney, Agent, or Firm—Finnegan, Henderson, Farabow, Garrett and Dunner

[57] ABSTRACT

A video tape recorder including a divider for sampling video data input into the video tape recorder and dividing the video data into N sub-picture data elements, where N is an integer equal to or larger than 2, a recorder head for recording the N sub-picture data elements on a recording medium, a data reproducing circuit for reproducing the first through M-th of the recorded sub-picture data elements, where M is an integer such that $1 \leq M < N$, a circuit for distributing the first through M-th sub-picture elements reproduced by the reproducing circuit, and a device for displaying the data elements distributed by the distributing circuit.

15 Claims, 11 Drawing Sheets

APPARATUS FOR PROCESSING DATA FOR A VIDEO TAPE RECORDER

FIELD OF THE INVENTION

The present invention relates generally to a video tape recorder, and more particularly, to a video tape recorder which digitizes, records and reproduces video data on and from a magnetic recording medium.

BACKGROUND OF THE INVENTION

As is well known, in the field of video equipment, for instance, video tape recorders which record still picture data on magnetic recording media such as magnetic tape, floppy disc, etc. and reproduce the recorded data have been developed. However, using this type of conventional video tape recorder, video data to be recorded are frequency modulated and recorded in analog on recording media and therefore, there are limits generated in maintaining the quality of the video data. As a result, picture quality tends to be deteriorated easily.

On the other hand, as a means to solve this problem, video data is digitally coded and recorded on recording media. While this means has merits in that the quality of recorded data can be satisfied without causing deterioration of picture quality, it has a problem in that a substantially longer time is needed than conventional devices when recording/reproducing picture data with sufficiently high quality (e.g., about 400 thousand pixels). This is because the volume and speed of information that can be handled by the recording/reproducing system are limited. For instance, when one pixel is expressed in eight bits of data, 400 thousand pixels will require 3.2 Mega bits of data and when information speed is assumed to be 1.55 Mega bps, 2.07 seconds will be needed for recording or reproducing one picture.

On such a video tape recorder requiring much time to record or reproduce one picture, it becomes difficult to realize a so-called quick turn-over function to look for desired pictures by retrieving pictures successively at high speed such as, for example, turning over pages of a book.

Figure 1:
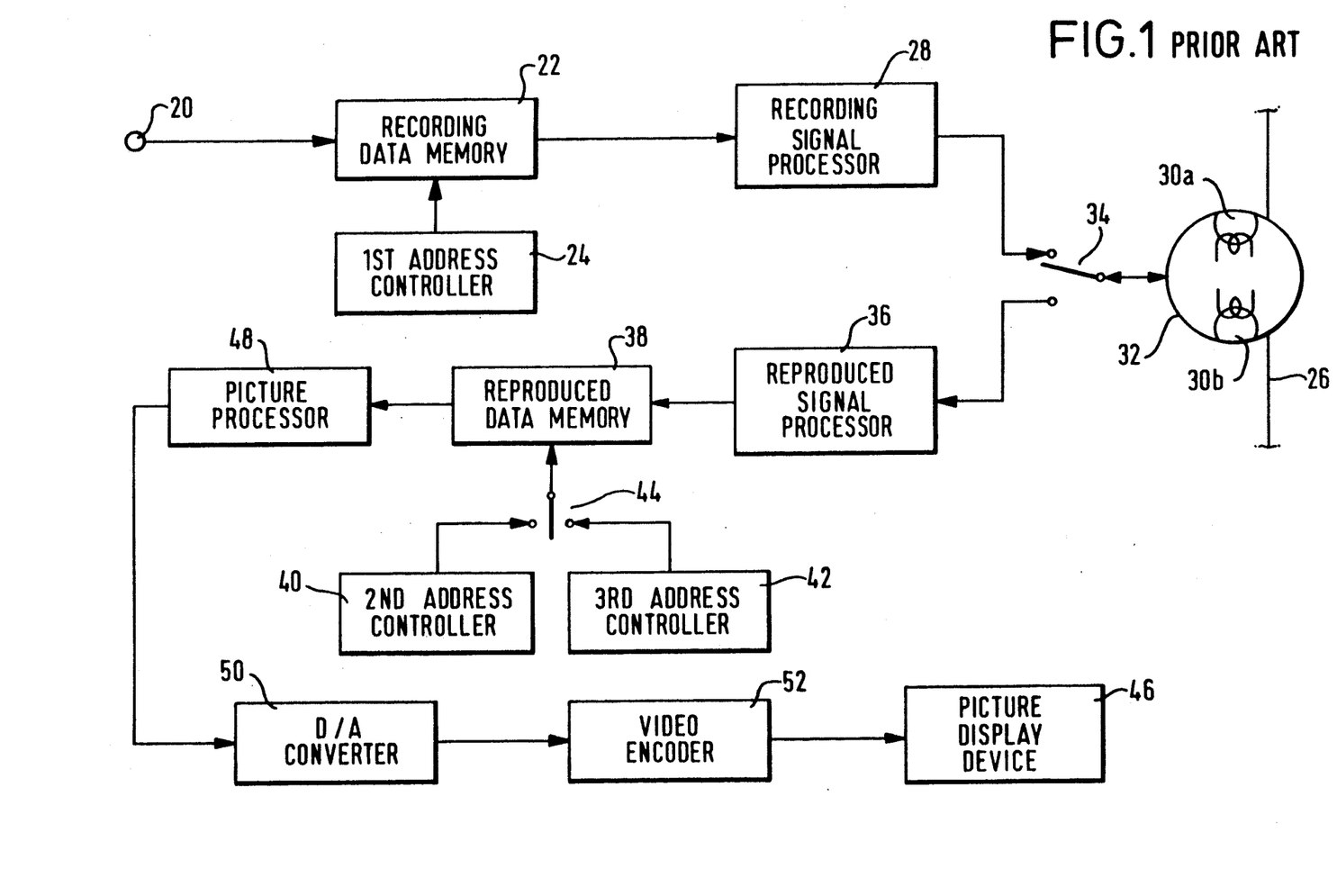
FIG. 1 is a block diagram showing a related video tape recorder.

So, a video tape recorder that is capable of realizing the quick turn-over function by displaying picture data reproduced from a recording medium while thinning them out (or decimating them) has been proposed. FIG. 1 shows a conventional video tape recorder which has been proposed in Japanese Patent Application; Toku-Gan-Sho 62-330501 filed on Dec. 26, 1987 (not published). In FIG. 1, an input terminal 20 is provided for receiving digitized picture data. The picture data applied to the input terminal 20 are stored in a recording data memory 22 and then are read out in a prescribed arrangement by a first address controller 24.

Figure 2:
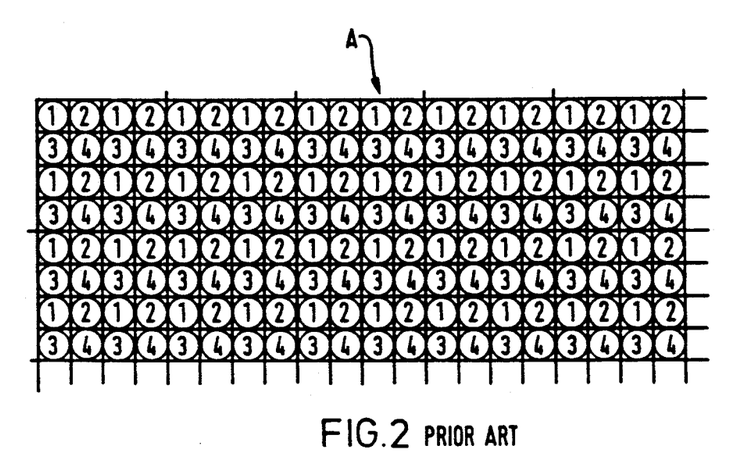
FIG. 2 is a diagram showing an example of pixel arrangement of the data arrangement circuit shown in FIG. 1.

Here, it is assumed that the portion shown by "A" in FIG. 2 is one digitally expressed complete picture and each pixel composing this one complete picture A is one picture element. The total pixels composing the one complete picture A are sampled half in the longitudinal (vertical) direction and half in the lateral (horizontal) direction, respectively, and divided into four sub-pictures. That is, picture A is divided into a first sub-picture having a group of pixels [1], a second sub-picture having a group of pixels [3], a third sub-picture having a group of pixels [3], and a fourth sub-picture having a group of pixels [4].

Figure 3:
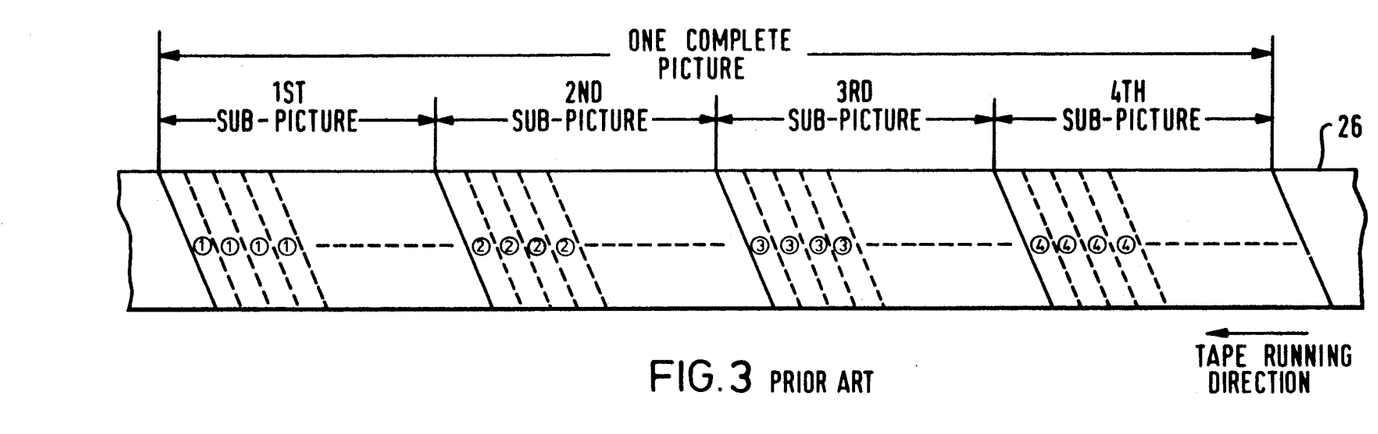
FIG. 3 is a diagram showing an example of recording by the video tape recorder shown in FIG. 1.

Picture data corresponding to these first to fourth sub-pictures are orderly arranged and recorded, as shown in FIG. 3, when, for instance, they are recorded on a magnetic tape 26 (see FIG. 1) by a helical scanning system. Therefore, the first address controller 24 controls the reading operation of the picture data stored in the recording data memory 22 in the order as shown in FIG. 3. That is, the first address controller 24 controls the recording data memory 22 in such a way as to read out the pixels [1] first and then, the pixels [2], [3] and [4] in that order.

The picture data which are thus output from the data arrangement converter 24 are then modulated for recording in a recording signal processor 28. The picture data thus modulated are alternately supplied to magnetic heads 30a, 30b which are supported by a rotary drum 32 via a record/playback mode selector (referred to as R/P mode selector hereafter) 34 after they are combined with parity bits for error correction.

Picture data obtained by reproducing magnetic tape 26 with the magnetic heads 30a, 30b are supplied to a reproduced signal processor 36 via the R/P mode selector 34 and undergo demodulation, error correction, and other correction processes. Thereafter, the picture data which are output from the reproduced signal processor 36 are written into a reproduced data memory 38. The reproduced data memory 38 is selectively coupled to either a second address controller 40 or a third address controller 42 through a display mode selector 44.

When reproduction of one complete picture is demanded, the second address controller 40 is selected by the display mode selector 44. Further, when reproducing one complete picture, the first through the fourth sub-picture signals recorded on the magnetic tape 26 are all read out by the magnetic heads 30a, 30b. Then, the second address controller 40 controls the reproduced data memory 38 to write therein all the picture data that are output from the reproduced signal processor 36. Therefore, the picture data of the first through fourth sub-pictures are written into the reproduced data memory 38 in such a way that the pixels are arranged as shown in FIG. 2.

Thereafter, the picture data are successively read out of the reproduced data memory 38 at a fixed rate and are supplied to a picture display device 46 through a picture processor 48, a digital/analog converter (referred to as D/A converter hereafter) 50, and a video encoder 52. Thus, one complete picture is displayed.

On the other hand, in the quick turn-over mode, the third address controller 42 is selected. Further, during the quick turn-over operation, the picture data record portion of only the first sub-picture is read from the the magnetic tape 26 by the magnetic heads and second through fourth sub-pictures are skipped.

Next, the third address controller 42 controls the reproduced data memory 38 to write therein the picture data of the first sub-picture which are output from the reproduced signal processor 36 in such a way that the pixels are arranged, as shown in pixel position [I] of FIG. 2. Further, nothing is recorded on the pixel positions [2], [3] and [4] where the picture data of the second through the fourth sub-pictures are to be written.

Thereafter, the picture data stored in the reproduced data memory 38 are read out at a fixed rate and are finally supplied to the picture display device 46 for display at the time of quick turn-over. In this case, as the picture display is carried out on the basis of the picture data of the first sub-picture, the picture quality itself may become rough but the purpose of the quick turn-over is achieved smoothly.

Therefore, as it has been so designed that only this picture data record portion of the first sub-picture of the magnetic tape 26 is reproduced and those of the second through the fourth sub-pictures are skipped during the quick turn-over, it becomes possible to perform the high-speed retrieval.

However, on such a conventional video tape recorder as mentioned above, the retrieval speed is fixed at a single speed and other speeds are not selectable. Further, only the picture data of the first sub-picture are read from the magnetic tape 26, skipping the picture data of the second through the fourth sub-pictures during the quick turn-over operation. Furthermore, a problem arises in which only a quarter of the sub-picture divided into four can be displayed all the time, especially in multiple picture display.

As described above, in retrieving desired pictures through the quick turn-over operation on a conventional video tape recorder, a defect exists such that the picture retrieval speed is fixed at one speed only while one complete picture is recorded after being divided into four sub-pictures during the reproduction through the quick turn-over operation, only the first sub-picture is reproduced, skipping other sub-pictures, and after rearranging the pixels of the reproduced first sub-picture in one complete picture area, only one picture consisting of this first sub-picture data only are displayed. Furthermore, a defect exists such that as the first through the fourth sub-picture data are recorded in order on a magnetic tape as described above, the fourth division sub-picture can be displayed only during the multiple display and the degree of freedom of the multiple display is restricted.

SUMMARY OF THE INVENTION

It is, therefore, an object of the present invention to provide a video tape recorder which is capable of removing the only defects, varying the retrieval speed in the quick turn-over operation and also, displaying sub-pictures by varying the number of sub-pictures during the multiple display.

In order to achieve the above object, a video tape recorder according to one aspect of the present invention includes a divider for sampling video data input into the video tape recorder and dividing the video data into N sub-picture data elements where N is an integer equal to or larger than 2, a recording head for recording the N sub-picture data elements on a recording medium, a data reproducing circuit for reproducing the first through M-th of the recorded sub-picture data elements, where M is an integer such that $1 \leq M < N$, a circuit for distributing the first through M-th sub-picture elements reproduced by the reproducing circuit, and a device for displaying the data elements distributed by the distributing circuit.

A video tape recorder according to another aspect of the present invention includes a divider for sampling luminance data input into the video tape recorder and dividing the luminance data into N sub-picture luminance data elements, where N is an integer equal to or larger than 2, a recording head for recording the N sub-picture luminance data elements on a recording medium, a color data (luminance data and/or color difference data) reproducing circuit for reproducing the first through M-th of the recorded sub-picture color data elements, where M is an integer such that $1 \leq M < N$, a circuit for distributing the first through M-th sub-picture color elements reproduced by the reproducing head, and a device for displaying the color data elements distributed by the distributing circuit.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to FIGS. 4 through 18. Throughout the drawings, reference numerals or letters used in FIGS. 1, 2 and 3 will be used to designate like or equivalent elements for simplicity of explanation.

Referring now to FIGS. 4 through 14, a first embodiment of the video tape recorder according to the present invention will be described in detail.

Figure 4:
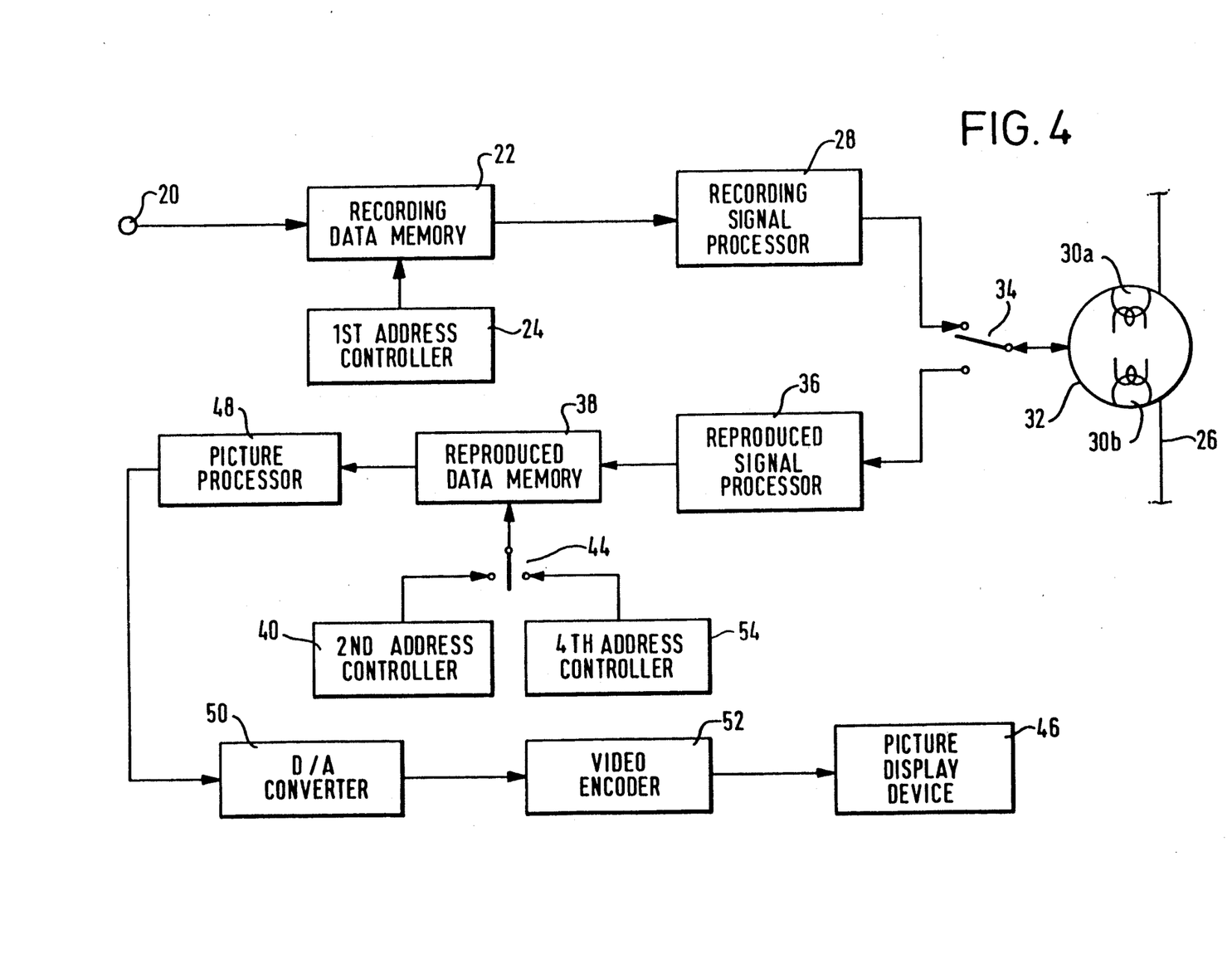
FIG. 4 is a block diagram showing an embodiment of the video tape recorder according to the present invention.

In FIG. 4, digitized picture data are applied to an input terminal 20. The picture data applied to the input terminal 20 are stored in a recording data memory 22 and then are read out in a prescribed arrangement by a first address controller 24. The picture data thus rearranged are output from the recording data memory 22. The picture data output from the recording data memory 22 are then modulated for recording in a recording signal processor 28. The picture data are supplied to magnetic heads 30a, 30b through an R/P (Record/-Playback) mode selector 34. The magnetic heads 30a, 30b record or reproduce the picture data on/from a magnetic tape 26. The magnetic heads 30a, 30b are supported by a rotary drum 32.

Picture data obtained by reproducing the magnetic tape 26 by the magnetic heads 30a, 30b are supplied to a reproduced signal processor 36 via the R/P mode selector 34 and undergo demodulation, error correction, and other correction processes. Thereafter, the picture data which are output from the reproduced signal processor 36 are written into a reproduced data memory 38. The reproduced data memory 38 is selectively coupled to either a second address controller 40 or a fourth address controller 54 by a display mode selector 44.

When the second address controller 40 is selected by the display mode selector 44, the playback operation of the magnetic tape 26 is carried out to reproduce the entire recorded picture data. At the same time, the second address controller 40 controls the reading address of the reproduced data memory 38 so that the reproduced picture data is rearranged to restore a fine image of the original picture.

When the fourth address controller 42 is selected by the display mode selector 44, the playback operation of the magnetic tape 26 is carried out intermittently. That is, a selected part of the recorded picture data is reproduced and stored in the reproduced data memory 38, but the non-selected parts of the recorded picture data are skipped. At the same time, the fourth address controller 54 controls the reading address of the reproduced data memory 38 so that the selected part of the reproduced picture data is arranged on the picture display device 46 in a pattern such as a mosaic shape. Therefore, a rough image of the original picture is reconstructed.

The picture data are successively read out of the reproduced data memory 38 and are supplied to a picture display device 46 through a picture processor 48, a D/A converter 50, and a video encoder 52. Thus, the fine image or the rough image of the original picture is displayed on the picture display device 46.

Now, the operations of the first embodiment of the video tape recorder will be described in detail with reference to FIGS. 5 through 14. Picture data, input through the input terminal 20, are once stored in the recording data memory 22 and then read out in the prescribed arrangement by the first address controller 24.

Figure 5:
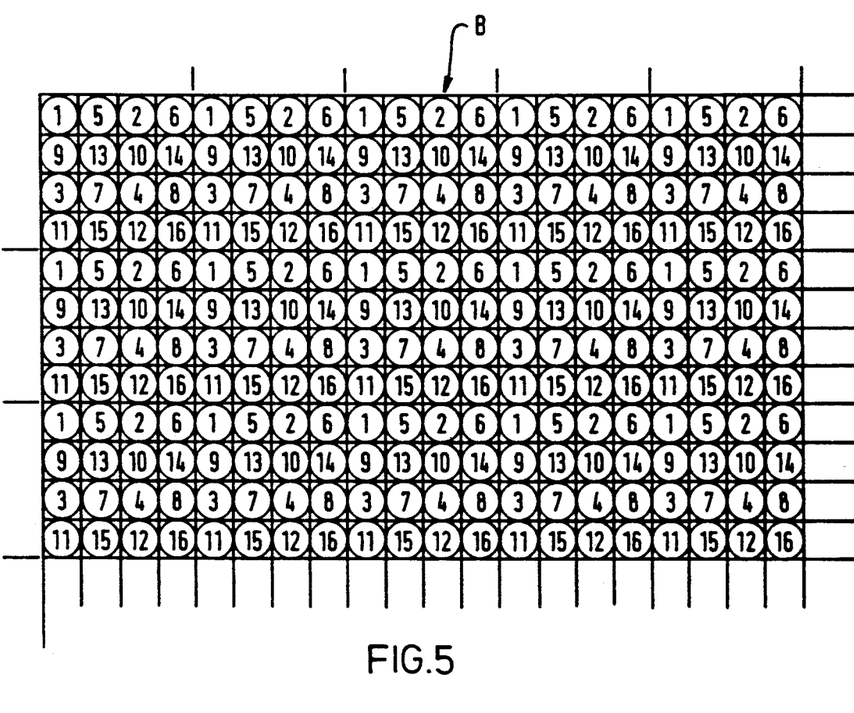
FIG. 5 is a diagram showing an example of pixel arrangement of the data arrangement converter shown in FIG. 4.

FIG. 5 shows a reading address design of the first address controller 24 for rearranging the picture data into blocks. According to the reading address design, each block of the picture data includes sixteen addresses [1] through [16] which are assigned to image pixels in each block. Hereinafter, the pixels in each block will be presented by their corresponding addresses [1] through [16]. These pixels [1] through [16] in each block are arranged into a square so that each block has four row pixels and four column pixels.

Figure 6:
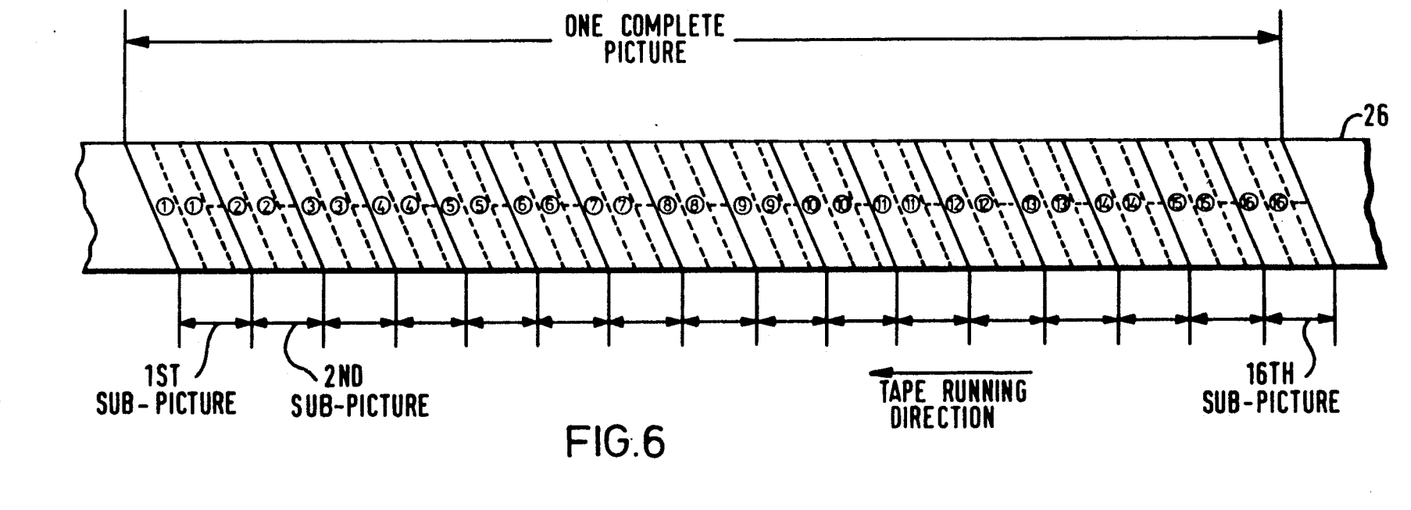
FIG. 6 is a diagram showing an example of recording by the video tape recorder shown in FIG. 4.

In the recording operation, the first address controller 24 controls the recording data memory 22 according to the reading address design. As a result, firstly, all the pixels [1] are read. Out from all the blocks. The pixels [1] are then recorded on a first zone of the magnetic tape 26, as shown in FIG. 6. The group of pixels [1] recorded on the first zone represents a first sub-picture when it is reproduced. When the reading operation of all the pixels [1] completes, then a group of pixels [2] are read out from all the blocks. The pixels [2] are then recorded on a second zone of the magnetic tape 26. The group of pixels [2] recorded on the second zone presents a second sub-picture when it is reproduced. In the same manner, reading operations of other pixels [3] through last pixels [16] are successively carried out.

These group of pixels [1] through [16] are orderly arranged and recorded in the unit of sub-pictures as shown in FIG. 6. Therefore the first address controller 24 performs the operation to read out the picture data stored in the recording data memory 22 in the sequence shown in FIG. 6.

The data of pixels [1] through [16] read from the recording data memory 22 are combined with parity bits for error correction and modulated for recording in the recording signal processor 28. Then, the data are supplied to the magnetic heads 30a, 30b supported by the rotary drum 32 through the R/P mode selector 34 (in the recording mode, the selector 34 is turned to the terminal R) and the picture data are recorded on the magnetic tape 26.

Then, the picture data obtained by scanning the magnetic tape 26 with the magnetic heads 30a, 30b at the time of reproduction are supplied to the reproduced signal processor 36 through the R/P mode selector 34 (in the playback mode, the selector 34 is turned to the terminal P) and are applied with the demodulation process, error correction, and other correction processes. Thereafter, the picture data, output from the reproduced signal processor 36, are written into the reproduced data memory 38.

When the reproduction of one complete picture is demanded, all the groups of pixels [1] through [16] are reproduced at a tape speed the same as in the recording mode. The second address controller 40 is then selected by the display mode selector 44. The second address controller 40 controls the reading address of the reproducing data memory 38. The second address controller 40 has a function of address control that is a reverse of the first address controller 24. Thus, the pixels [1] through [16] of the first through the sixteenth sub-pictures are rearranged on the picture display device 46, as shown in FIG. 5.

In the meantime, the picture data read out from the reproduced data memory 38 are converted into analog video data by the D/A converter 50 and then encoded into a suitable video data by the video encoder 52.

When any quick turn-over operation is demanded, only the group of pixels [1] or a several successive groups including the group of pixels [1] but excluding at least the last group of pixels [16] are reproduced at the tape speed the same as in the recording mode. On the other hand, the latter groups including the last group of pixels [16] are skipped at a high speed, e.g., a predetermined tape fast forward speed. The fourth address controller 54 is then selected by the display mode selector 44. The fourth address controller 54 controls the reading address of the reproducing data memory 38.

In the quick turn-over mode, fifteen stages are available. At the first stage of the quick turn-over mode, only the group of pixels [1] is reproduced from the magnetic tape 26, but the other fifteen groups are skipped. At the fifteenth stage of the quick turn-over mode, the groups of pixels [1] to [15] are successively reproduced from the magnetic tape 26, but the group of pixels [16] is skipped.

Figure 7:
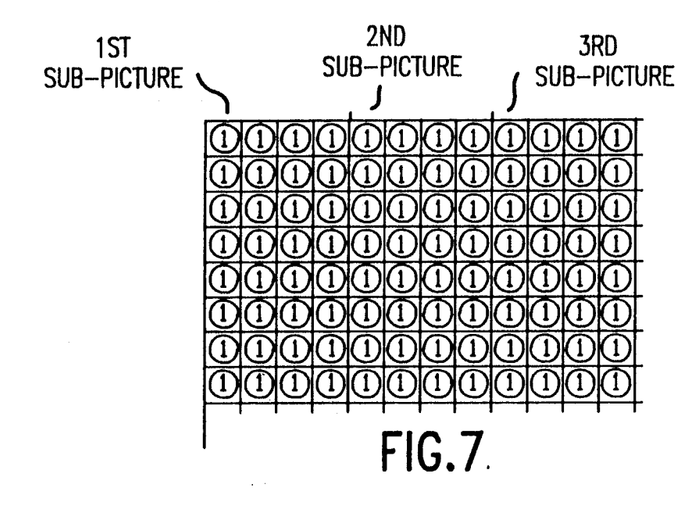
FIG. 7 is a diagram showing an example of pixel arrangement of the mosaic converter shown in FIG. 4 in the 16 times quick turn-over mode.

When the first stage of the quick turn-over mode is selected, the picture data of only the group of pixels [1] are written into the reproducing data memory 38. Then, the fourth address controller 54 controls the reading address of the reproducing data memory 38 so that the pixels [1] are rearranged on the picture display device 46, as shown in FIG. 7. In this operation, the pixels [2] through [16] on each block of the original image (see FIG. 5) are substituted by duplications of the pixels [1]. The image constituted by only group of pixels [1] is roughened sixteen times compared to the original image. However, a sixteen time quick turn-over display is obtained.

Figure 8:
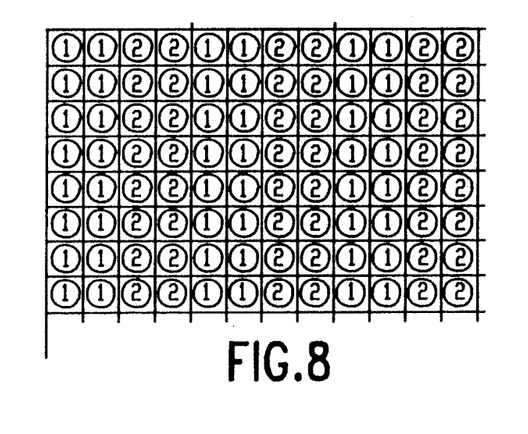
FIG. 8 is a diagram showing an example of pixel arrangement of the mosaic converter shown in FIG. 4 in the 8 times quick turn-over mode.

When the second stage of the quick turn-over mode is selected, the picture data of two groups of pixels [1] and [2] are written into the reproducing data memory 38. Then, the fourth address controller 54 controls the reading address of the reproducing data memory 38 so that the groups of pixels [1] and [2] are rearranged on the picture display device 46, as shown in FIG. 8. In this operation, the pixels [3] through [16] on each block of the original image (see FIG. 5) are substituted by duplications of the pixels [1] and [2]. The image constituted by only groups of pixels [1] and [2] is roughened eight times compared to the original image. However, an eight time quick turn-over display is obtained.

Figure 9:
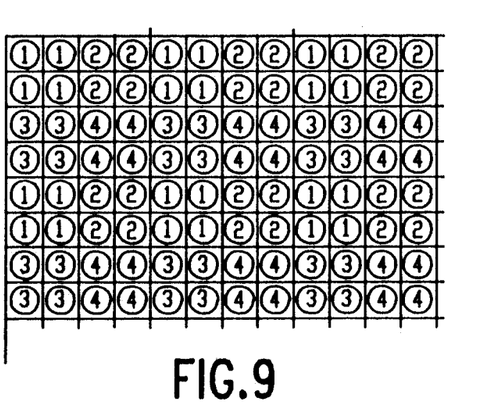
FIG. 9 is a diagram showing an example of pixel arrangement of the mosaic converter shown in FIG. 4 in the 4 times quick turn-over mode.
Figure 10:
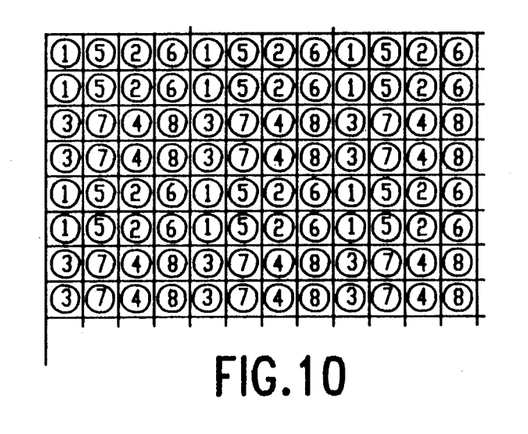
FIG. 10 is a diagram showing an example of pixel arrangement of the mosaic converter shown in FIG. 4 in the 2 times quick turn-over mode.

In the same manner, the other stages of the quick turn-over mode can be carried out. For example, FIGS. 9 and 10 show the pixel arrangements at a four time quick turn-over display and a two time quick turn-over display, respectively.

Figures 11A, 11B:
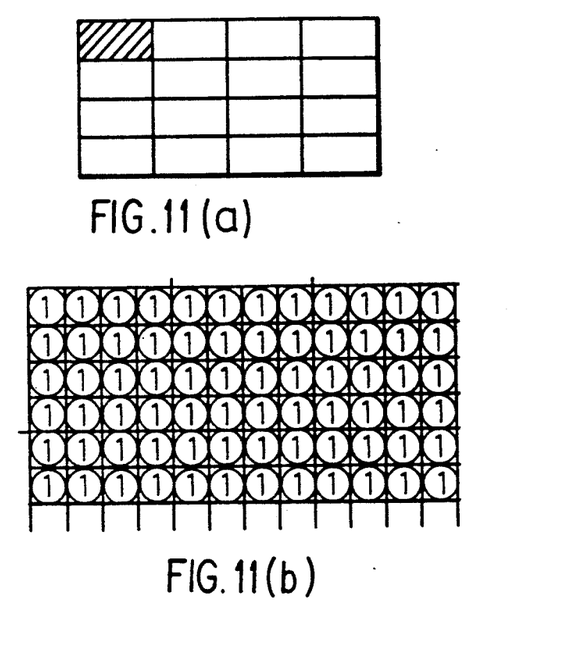
FIGS. 11a and 11b are diagrams showing an example of writing of pixels into memory when the 16 division display is made on the video tape recorder shown in FIG. 4.
Figures 12A, 12B:
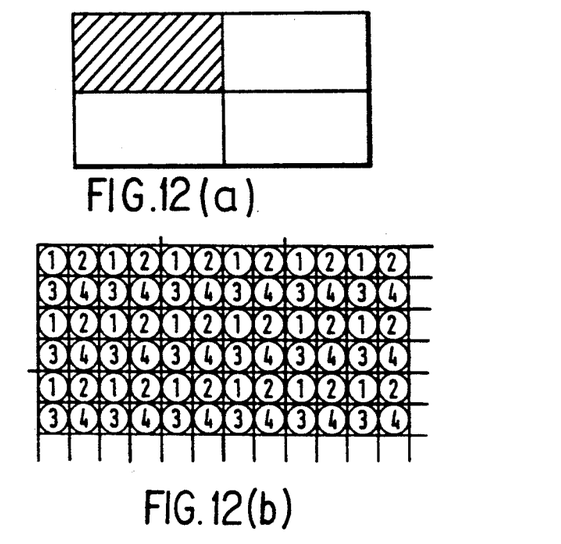
FIGS. 12a and 12b are diagrams showing an example of writing of pixels into memory when the four division display is made on the video tape recorder shown in FIG. 4.

In the above embodiment, the images at the quick turn-over modes are displayed on the full screen of the display device 46. However, the images can be displayed on a reduced scale. For example, the pixels [1] read at the sixteen time quick turn-over mode can be displayed by one sixteenth scale, as shown in FIG. 11(a). Thus, the reduced scale image can be displayed with another background image or other reduced scale images of the same quick turn-over mode. In this reduced scale image display, the pixels [1] are read out from the reproduced data memory 38 without duplication. Thus, the pixels [1] extracted by one from each block are gathered in the one sixteenth reduced scale display area, as shown in FIG. 11(b). For another example, the image at the four time quick turn-over mode is displayed by one fourth reduced scale, as shown in FIG. 12(a). In this one fourth reduced scale image display, the pixels [1], [2], [3] and [4] each extracted by one from each block are gathered in the one fourth reduced scale display area, as shown in FIG. 12(b).

According to this embodiment, one complete picture is divided into, for example, sixteen blocks. Each of sixteen blocks includes sixteen pixels. The first sub-picture through the sixteenth sub-picture includes picture data corresponding to the pixels at the same positions of each block, and the pixels of respective blocks are successively arranged and recorded on the magnetic tape 26 as one sub-picture data for each picture data corresponding to the pixels at the same locations of each block.

At the time of reproduction, it is possible to set up not only the four quick turn-over modes as described above but also any of fifteen quick turn-over modes, and to change picture retrieval speed. Furthermore, the picture may be displayed in various division display forms. For instance, not only the one sixteenth and one fourth reduced scale image displays but also one eighth or one-half reduced scale image displays can be used for multiple display. Thus, the number of division display pictures can be changed at the time of the multiple display.

In the above embodiment, the recording data memory 22 and the reproducing data memory 38 are constituted by separate memories, as shown in FIG. 4. But, they can be constituted by a common memory which can be used for both the recording and reproducing modes.

FIG. 5 shows a reading address design of the first address controller 24 for rearranging the picture data into blocks. According to the reading address design, each block of the picture data includes sixteen addresses [1] through [16] which are assigned to image pixels in each block. Hereinafter, the pixels in each block will be represented by their corresponding addresses [1] through [16]. These pixels [1] through [16] in each block are arranged into a square so that each block has four row pixels and four column pixels.

Figure 13A:
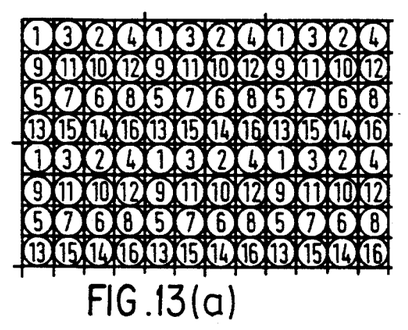
FIGS. 13(a) through 13(c) are diagrams showing another example of pixel arrangement of the data arrangement converter shown in FIG. 4.
Figure 13B:
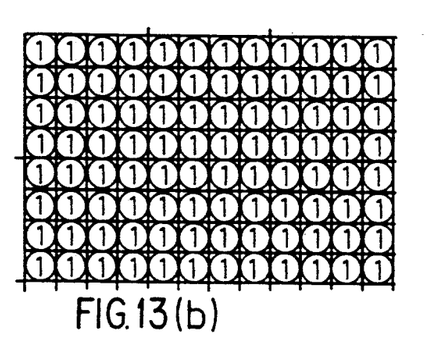
Figure 13C:
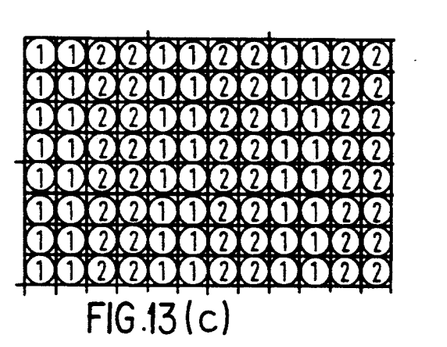
Figure 13D:
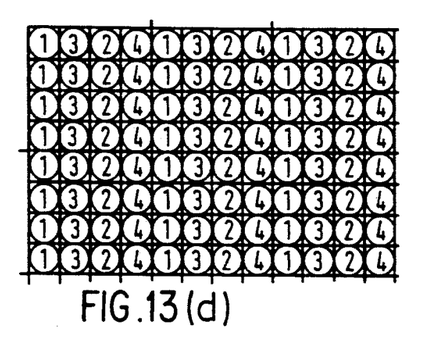
Figure 13E:
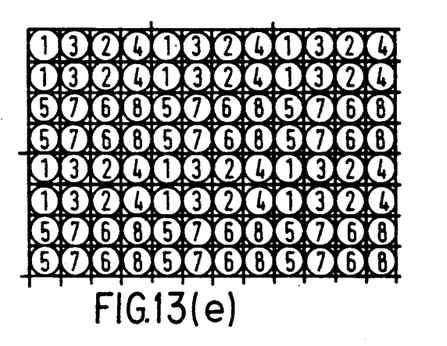

Further, several modifications of the data rearrangement are also available. FIG. 13(a) shows a modification of the reading address design of the first address controller 24 rearranging the picture data into blocks. The reading address design of FIG. 13(a) corresponds to the reading address design of FIG. 5. FIG. 13(b) shows a modification of the reading address controller 54 at the sixteen time quick turn-over mode. This reading address design of FIG. 13(b) corresponds to the reading address design of FIG. 7. FIG. 13(c) shows a modification of the reading address controller 54 at the eight time quick turn-over mode. This reading address design of FIG. 13(c) corresponds to the reading address design of FIG. 8. FIG. 13(d) shows a modification of the reading address controller 54 at the four time quick turn-over mode. This reading address design of FIG. 13(d) corresponds to the reading address design of FIG. 9. FIG. 13(e) shows a modification of the reading address controller 54 at the two time quick turn-over mode. This reading address design of FIG. 13(e) corresponds to the reading address design of FIG. 10.

Referring now to FIGS. 15 through 18, a second embodiment of the video tape recorder according to the present invention will be described. The second embodiment is applied to color system of the video tape recorder. In the color video tape recorder, a color picture data consist of a luminance signal y and two color difference signals R-Y, B-Y. The two color difference signals R-Y, B-Y are arranged alternately for every one horizontal or vertical line. Typically, the luminance signal y and two color difference signals R-Y, B-Y have a data ratio [2:1:1.]

Figure 15:
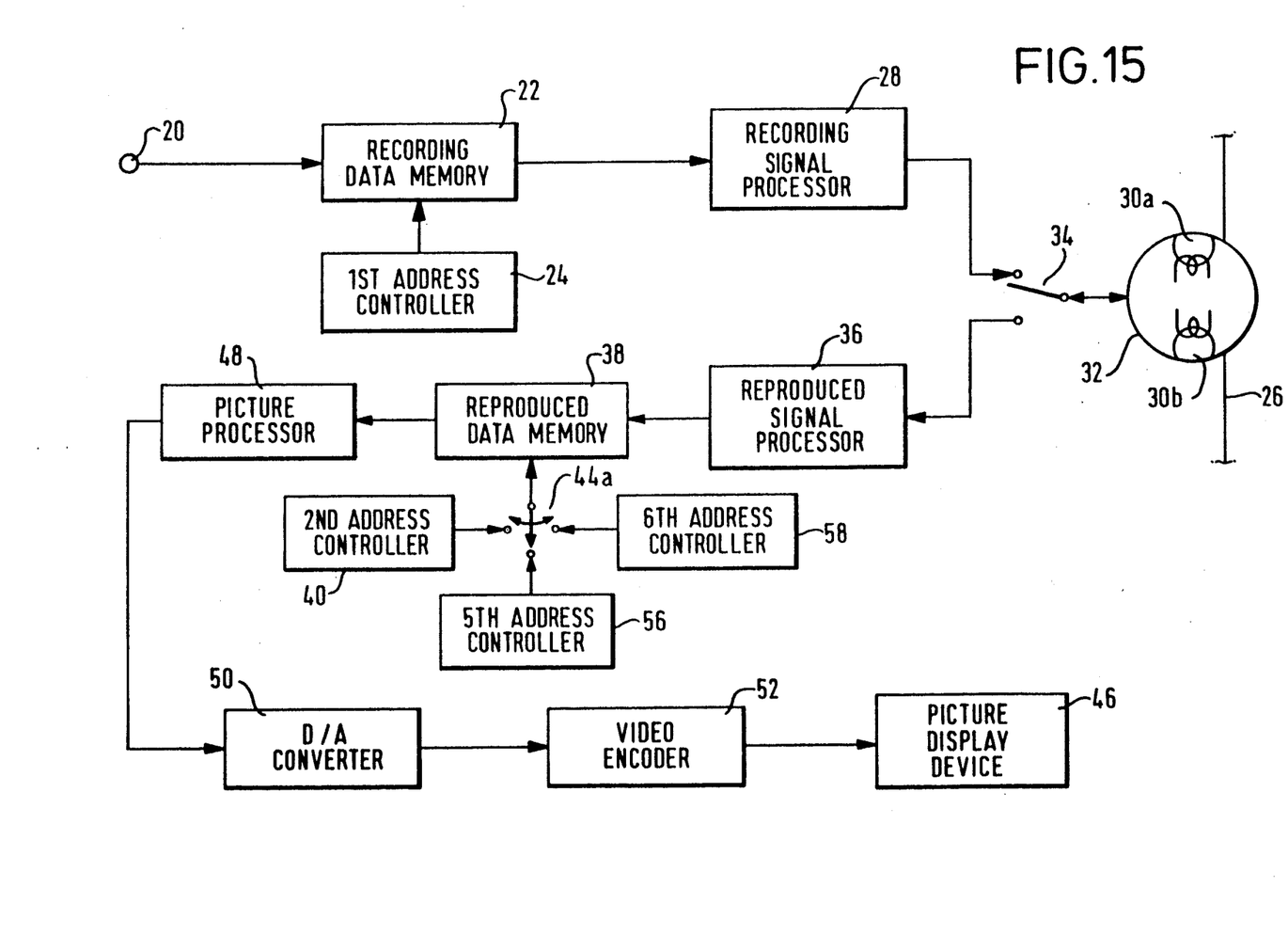
FIG. 15 is a block diagram showing a second embodiment of the video tape recorder according to the present invention.

FIG. 15 shows the second embodiment of the video tape recorder according to the present invention. The second embodiment is different from the first embodiment (see FIG. 4) in that the second embodiment has three address controllers 40, 56, 58 for the reproducing data memory 38. Among the three address controllers, the controller 40 corresponds to the second address controller 40 of the first embodiment. Two other controllers, i.e., fifth and sixth address controllers 56. 58 correspond to the fourth address controller 54 of the first embodiment. Either one of the fifth and sixth address controllers 56, 58 may be selected by a display mode selector 44a in the quick turn-over mode.

Figure 14A:
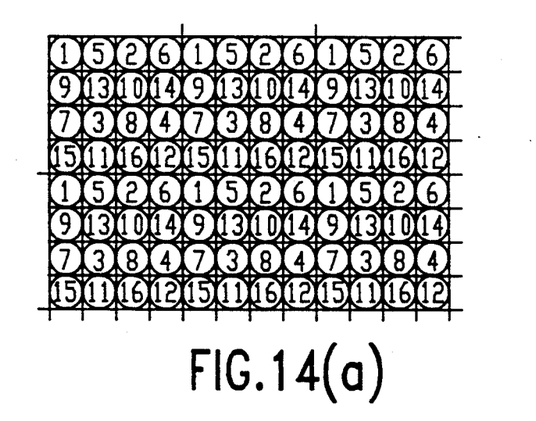
FIGS. 14(a) through 14(e) are diagrams showing another example of pixel arrangement of the data arrangement converter shown in FIG. 4.
Figure 14B:
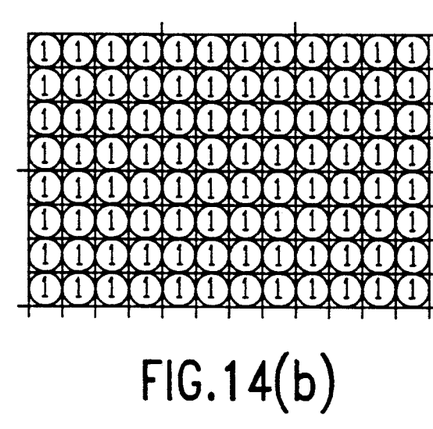
Figure 14C:
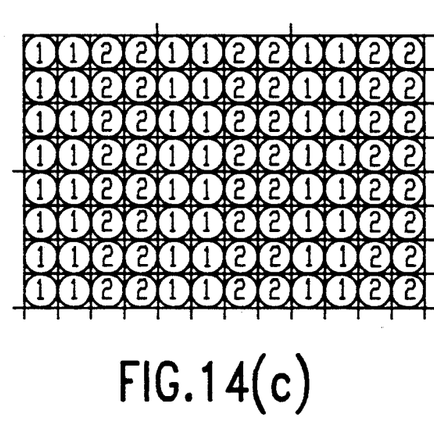
Figure 14D:
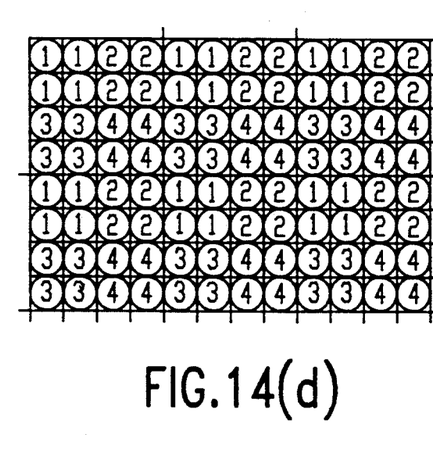
Figure 14E:
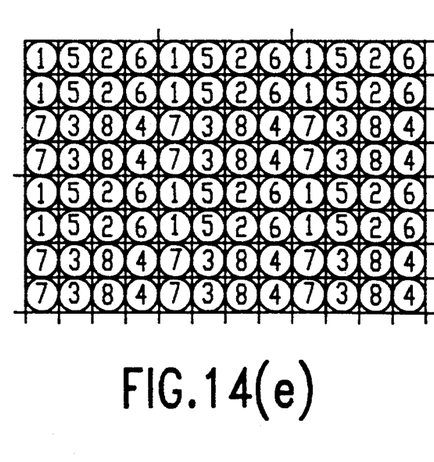

The different arrangements of the luminance signal Y in this second embodiment are not shown since they are identical to the examples as shown in FIGS. 5, 13(a) and 14(a). For the purposes of this second embodiment, the pixels labelled as [1] to [16] in FIGS. 5, 13(a) and 14(a) should be replaced by [Y1] to [Y16], respectively.

Luminance signal components Y1, Y2 and color difference signal components R-Y, B-Y are read out by the first address controller 24. Now, the luminance signal components Y1, Y2 will be represented by luminance pixels [Y1], [Y2] . . . , while the color difference signal components R-Y, B-Y will be represented by first color pixels [R1], [R2] . . . and second color pixels [B1], [B2] . . . . For example, the first color pixels [R1], [R2] . . . are shown in FIG. 17. These color pixels are read out in the ordered sequence by line, e.g., in the order of the color pixels [R1], [B1] . . . for the odd number block lines. Then, the color pixels [R1], [B1] . . . for the even number block lines are read. Further, in the first address controller 24, the luminance pixel [Y1] in the first block line and the color pixel [R1] in the same block are first read out. Next, the luminance pixel [Y1] in the second block line and the color pixel [B1] in the first block line. Further in the same block row as the luminance pixel [Y1] are read out secondly the luminance pixel [Y1] in the third block line. The color pixel [R1] in the same block are read out thirdly, the luminance pixel [Y1] in the fourth block line and the color pixel [B1] in the third block line and in the same block row as the luminance pixel [Y1] are read out fourthly. When all the luminance pixel [Y1] are read out to the last line, the luminance pixel [Y2] in the first block line and the color pixel [R1] in the second block line and the same row, the luminance pixel [Y2] in the second block line and the color pixel [B1] in the same block and so on are read out. That is, the luminance signal y is read out in order of block lines and the color difference signals R-Y and B-Y are read out by skipping the block rows and recorded on the magnetic tape 26, as shown in FIG. 16.

In this embodiment, the first sub-picture composing the picture data in the first turn-over mode consists of the luminance pixels [Y1] of all blocks and the color pixels [R1], [B1] of the odd number block lines. The picture data in the second turn-over mode consist of the first sub-picture data and the second sub-picture data. This second sub-picture consists of the luminance pixel [Y2] of all blocks and the color pixels [R1], [B1] of the even number block lines. The second sub-picture is recorded on the magnetic tape 26 as video data next to the first sub-picture.

Figure 16:
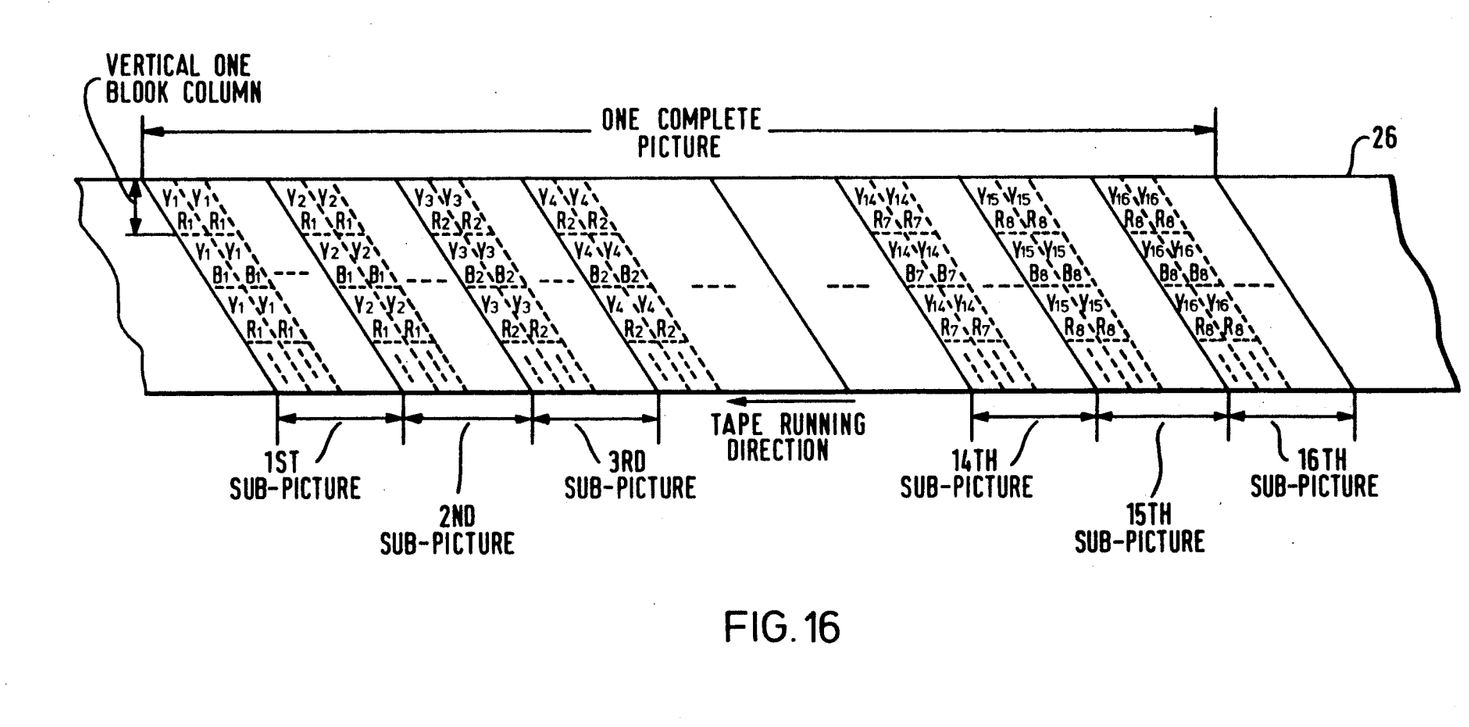
FIG. 16 is a diagram showing an example of picture data recording by the video tape recorder shown in FIG. 15.
Figure 17:
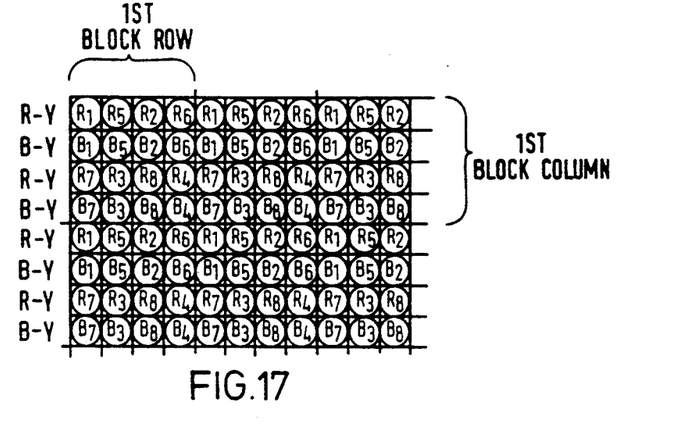
FIG. 17 is a diagram showing an example of rearrangement of color difference signals by the picture data arrangement reverse converter in FIG. 15.
Figure 18A:
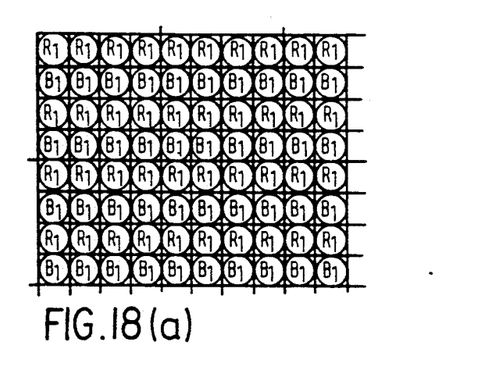
FIGS. 18(a) through 18(d) are diagrams showing an example of rearrangement of color difference signals by the color difference signal mosaic converter shown in FIG. 15.

When demanding reproduction of one complete picture, the video data for one picture recorded on the magnetic tape 26 are read by the magnetic heads 30a, 30b, as shown in FIG. 16. The fifth address controller 56 is selected by the display mode selector 44a. The luminance pixel data [Y] are written into the reproduced data memory 38 by the fifth address controller 56 in one of the arrangements of pixels shown in FIGS. 5, 13(a) and 14(a). The color pixel data [R], [B] are written into the reproduced data memory 38 by the sixth address controller 58 in the arrangement of pixels, as shown in FIG. 18(a).

Next, the quick turn-over mode will be described. In this quick turn-over mode, the fifth and sixth address controllers 56, 58 are alternately selected. Thus, processings are carried out as follows. In the first turn-over mode, only the picture data for the first sub-picture recorded on the magnetic tape 26 are read out by the magnetic heads 30a, 30b, as shown in FIG. 16. Other picture data for the second through the sixteenth sub-pictures are skipped.

The fifth address controller 56 performs the same process as the fourth address controller 54 of the first embodiment (see FIG. 4). Color difference signals are read out from the reproduced data memory 38 under the control of the sixth address controller 58 in such a manner that picture elements are rearranged so that they are represented by the color pixels [R1], [B1] in the corresponding blocks for every vertical line of the odd number block lines, and by the color pixels [R1], [B1] on one block line for every vertical line of the even number block lines as shown in FIG. 18(a).

Figure 18B:
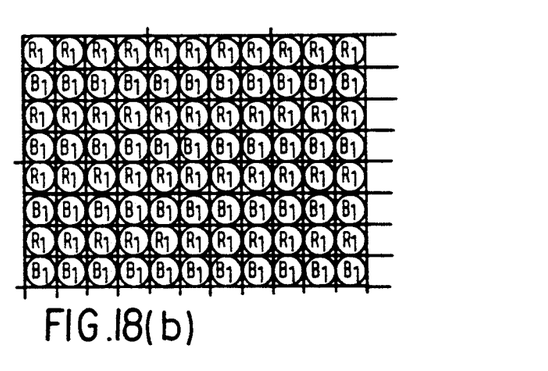

In the second turn-over mode, only picture data for the first and the second sub-picture are read from the magnetic tape 26 by the magnetic heads 30a, 30b and other picture data for the third through the sixteenth sub-pictures are skipped. The operation of the fifth address controller 56 is the same as that of the fourth address controller 54 of the embodiment as shown in FIG. 4. The color difference signals are read out from the reproduced data memory 38 under the control of the sixth address controller 58 so that sixteen pixels, i.e., (four pixels on horizontal axis) x (four pixels on vertical axis) of each block are represented by the color pixels [R1] and the other color pixels [B1] corresponding to the sub-pictures of every vertical line, as shown in FIG. 18(b).

Figure 18C:
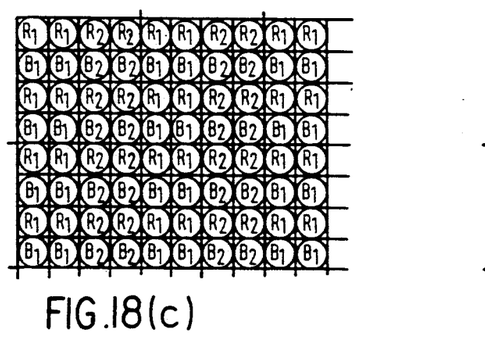

In the third turn-over mode, only picture data for the first through the fourth sub-pictures are read from the magnetic tape 26 and the fifth through the sixteenth sub-pictures are skipped. In this third turn-over mode, the operation of the fourth address controller 56 is the same as the fourth address controller 54 in the embodiment as shown in FIG. 4. The color difference signals are read from the reproduced data memory 38 under the control of the sixth address controller 58. Thus, the sixteen pixels of each block are represented by the first color pixels [R1], [R2] and the second color pixels [B1], [B2] corresponding to the sub-pictures for every vertical line, as shown in FIG. 18(c).

Figure 18D:
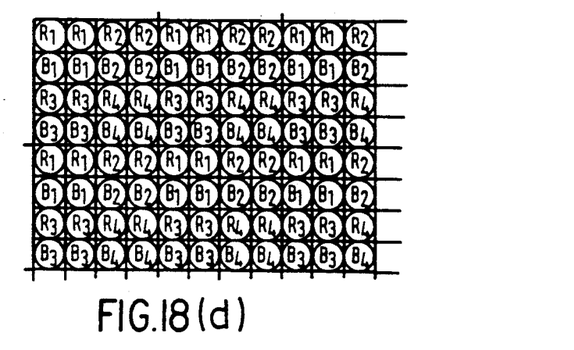

In the fourth turn-over mode, only picture data for the first through the eighth sub-pictures are read from the magnetic tape 26 by the magnetic heads 30a, 30b and other pixels for the ninth through the sixteenth sub-pictures are skipped. In this case, the operation of the fifth address controller 56 is the same as the fourth address controller 54 in the embodiment, as shown in FIG. 4. The color difference signals are read out from the reproduced data memory 38 under the control of the sixth address controller 58. Thus, sixteen total pixels of each block are represented by the color pixels [R1], [R2], [R3], [R4] and the other color pixels [B1], [B2], [B3], [B4] corresponding to the sub-pictures, as shown in FIG. 18(d).

This embodiment has the same effect as in the embodiment described above and the operations of other circuits are the same as those in the embodiment as shown in FIG. 4. Further, assignment of numbers to the color difference signals, as shown in FIG. 17, is in accordance with FIG. 14(a). As should be apparent, numbers can be also assigned according to FIG. 5 or FIG. 13(a). Alternatively, the ratio of the number of picture data among the luminance signal Y and the color difference signals R-Y, B-Y may be [4:1:1].

This ratio can be achieved by representing picture data of the color difference signals with a value in one block and by substituting three peripheral blocks with the above-mentioned picture data with four blocks as one unit in the first quick turn-over mode. In the second quick turn-over mode, the ratio can be achieved by substituting the picture data of the color difference signals for the blocks in the same row and one line below as in the other embodiments, with two vertical blocks as one unit.

As described above, the present invention can provide an extremely preferable video tape recorder.

While there have been illustrated and described what are, at present, considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A video tape recorder comprising:
   dividing means for sampling video data applied to the video tape recorder and dividing the video data into N sub-picture data elements, where N is an integer equal to or larger than 2;
   means for recording the N sub-picture data elements on a recording medium;
   data reproducing means for reproducing first through M-th of the recorded N sub-picture data elements, where M is an integer such that $1 \leq M < N$;
   means for distributing the first through M-th sub-picture elements reproduced by the reproducing means into predetermined groups; and
   means for displaying the data elements distributed by the distributing means.

2. A video tape recorder according to claim 1, wherein the dividing means includes a first memory having a first reading address for storing the input data and a first address control means for controlling the first reading address so that the video data stored in the first memory are read from the first memory in a predetermined order, said video data being divided into the N sub-picture data elements.

3. A video tape recorder according to claim 2, wherein the distributing means includes a second memory having a second reading address for storing the reproduced data and a second address control means for controlling the second reading address so that the video data read from the second memory are arranged on the displaying means in a predetermined pattern.

4. A video tape recorder according to claim 3, further comprises means for processing the video data read from the second memory so that the video data are displayed on a portion of the displaying means.

5. A video tape recorder according to claim 4, wherein the processing means includes means for processing the video data for a plurality of pictures so that the video data of the plurality of pictures are displayed on divided portions of the displaying means.

6. A video tape recorder comprising:
   dividing means for sampling luminance data applied to the video tape recorder and dividing the luminance data into N sub-picture luminance data elements, where N is an integer equal to or larger than 2;
   means for recording the N sub-picture luminance data elements on a recording medium;
   data reproducing means for reproducing first through M-th of the recorded N sub-picture luminance data elements, where M is an integer such that $1 \leq M < N$;
   means for distributing the first through M-th sub-picture luminance elements reproduced by the reproducing means into predetermined groups; and
   means for displaying the luminance data elements distributed by the distributing means.

7. A video tape recorder according to claim 6, wherein the dividing means includes a first memory having a first reading address for storing the input luminance data and a first address control means for controlling the first reading address so that the luminance data stored in the first memory are read from the first memory in a predetermined order, said luminance data being divided into the N sub-picture luminance data elements.

8. A video tape recorder according to claim 7, wherein the distributing means includes a second memory having a second reading address for storing the reproduced luminance data and a second address control means for controlling the second reading address so that the luminance data read from the second memory are arranged on the displaying means in a predetermined pattern.

9. A video tape recorder according to claim 8, further comprises means for processing the luminance data read from the second memory so that the luminance data are displayed on a portion of the displaying means.

10. A video tape recorder according to claim 9, wherein the processing means includes means for processing the luminance data for a plurality of pictures so that the luminance data of the plurality of pictures are displayed on divided portions of the displaying means.

11. A video tape recorder, comprising:
   dividing means for sampling color difference data applied to the video tape recorder and dividing the color difference data into N sub-picture color difference data elements, where N is an integer equal to or larger than 2;

means for recording the N sub-picture color difference data elements on a recording medium;

data reproducing means for reproducing first through M-th of the recorded N sub-picture color difference data elements, where M is an integer such that $1 \leq M < N$;

means for distributing the first through M-th sub-picture color difference elements reproduced by the reproducing means into predetermined groups; and means for displaying the color difference data elements distributed by the distributing means.

12. A video tape recorder according to claim 11, wherein the dividing means includes a first memory having a first reading address for storing the input color difference data and a first address control means for controlling the first reading address so that the color difference data stored in the first memory are read from the first memory in a predetermined order, said color difference data being divided into the N sub-picture color difference data elements.

13. A video tape recorder according to claim 12, wherein the distributing means includes a second memory having a second reading address for storing the reproduced color difference data and a second address control means for controlling the second reading address so that the color difference data read from the second memory are arranged on the displaying means in a predetermined pattern.

14. A video tape recorder according to claim 13, further comprises means for processing the color difference data read from the second memory so that the color difference data are displayed on a portion of the displaying means.

15. A video tape recorder according to claim 14, wherein the processing means includes means for processing the color difference data for a plurality of pictures so that the color difference data of the plurality of pictures are displayed on divided portions of the displaying means.

* * * * *